T. D. KELLY.
SPRING SUSPENSION FOR CYCLES.
APPLICATION FILED AUG. 5, 1920.

1,438,919.

Patented Dec. 12, 1922.

Inventor
Thomas D. Kelly
By
Attorney

Patented Dec. 12, 1922.

1,438,919

UNITED STATES PATENT OFFICE.

THOMAS DANIEL KELLY, OF HOVE, ENGLAND.

SPRING SUSPENSION FOR CYCLES.

Application filed August 5, 1920. Serial No. 401,495.

*To all whom it may concern:*

Be it known that THOMAS DANIEL KELLY, a subject of the King of Great Britain, residing at Hove, Sussex, England, has invented certain new and useful Improvements in Spring Suspensions for Cycles, of which the following is a specification.

This invention relates to a method of springing cycles whereby the rider, engine, (if employed) pedals and all transmission and other gear are insulated and held in suspension and free from any road shocks.

For the purpose of this invention I employ a leaf spring or springs in supporting the front and back wheels with the frame and so connect such leaf spring that the road shocks are taken up by the leaf spring and not communicated in any appreciable degree to the frame.

The frame I prefer to employ consists of a front frame member comprising in part a steering pillar which is provided with a depending bracket to the base of which is rigidly connected one end of a leaf spring or springs which may be straight or curved.

The front wheel is provided with the usual steering post and forks which post carries the handles as is usual.

The spring is connected at its free end to a rear frame member carrying the back wheel, positioned at a slight angle thereto, which rear frame member may carry the power engine and gear or a portion of same and both frame members may carry the seat.

I provide means whereby any side and longitudinal movement can be prevented by limiting the movement of the horizontal leaf spring by interposing a support between the steering pillar and the rear frame member in the shape of a stay suitably shaped and branching at angles reaching to the two ends of a rod or a pedal axle bracket positioned at right angles to the direction of travel and attached to an appliance connected to the free rear end of the horizontal spring.

My invention will be clearly understood from the following description aided by the annexed drawings in which—

Figure 1:
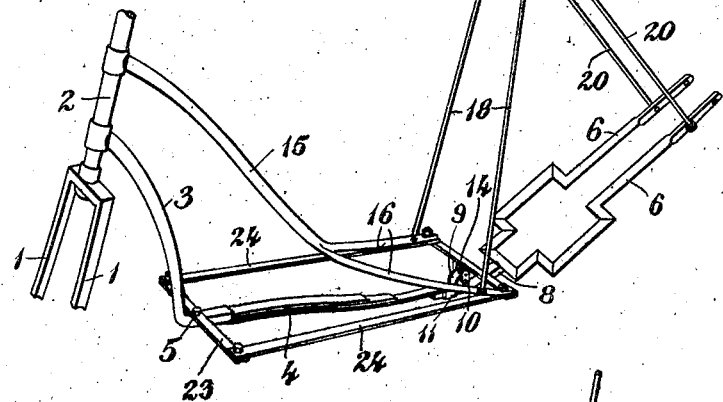
Figure 1 is a perspective view of a frame of a motor cycle and showing my invention embodied therein.
Figure 2:
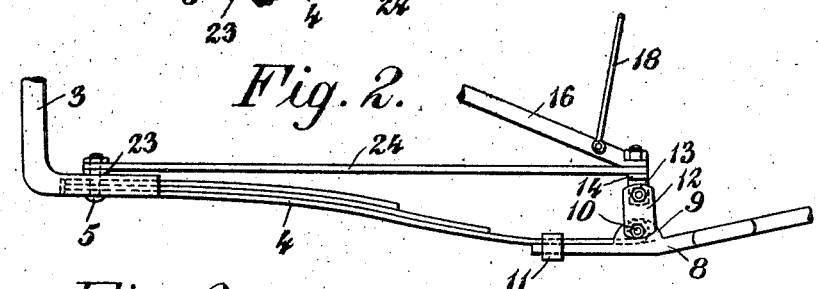
Figure 2 is a side elevation (enlarged) of a portion of the depending bracket and the rear frame and showing the connection of the leaf spring.
Figure 3:
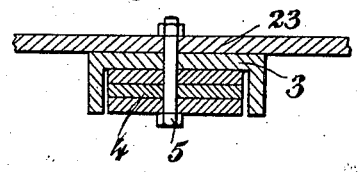
Figure 3 is a section of the connection of the leaf spring to the depending bracket.
Figure 4:
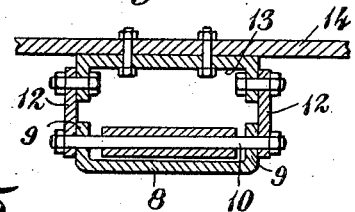
Figure 4 is a section of the joint at the free end of the spring.
Figure 5:
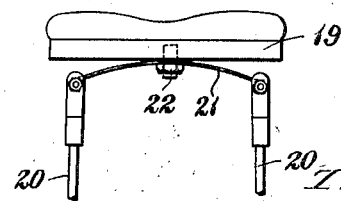
Figure 5 is a back view of the seat and showing the spring connection.

According to my invention the ordinary front wheel forks 1 and steering pillar 2 are arranged as is usual in cycles but to the steering pillar 2 is secured a depending bracket 3 which is positioned behind the front wheel and preferably extends just below the horizontal line of the axle where its end is bent and formed in the shape of an inverted channel for receiving the thick end of a leaf spring 4 to which it is firmly secured, the leaves of the spring fitting inside the channel thus obviating any side movement being given to the spring.

The leaf spring 4 as shown, is composed of three leaves of different lengths with their ends placed coincidentally in the channel and secured thereto in any suitable manner or by a bolt 5 as shown.

I construct the back forks 6, 6 for carrying the back wheel 7, such forks 6 being of a construction to suit the class of cycle intended; the apex or closed end of such forks is connected to an arm 8 having turned up ears 9, 9 on the sides, such ears 9, 9 having bolt holes. The back forks 6, 6 have an upward sloping direction from the arm 8 so that the axle of the back wheel is carried at a higher point than the joint at which the arm 8 is connected to the spring 4.

The free end of the bottom leaf of the spring 4 is curled, and through the curled end and the bolt holes in the ears is passed a bolt 10, which secures the spring 4 to the arm 8, and this is assisted by a clip 11 embracing the spring 4 and the arm 8.

Figure 6:
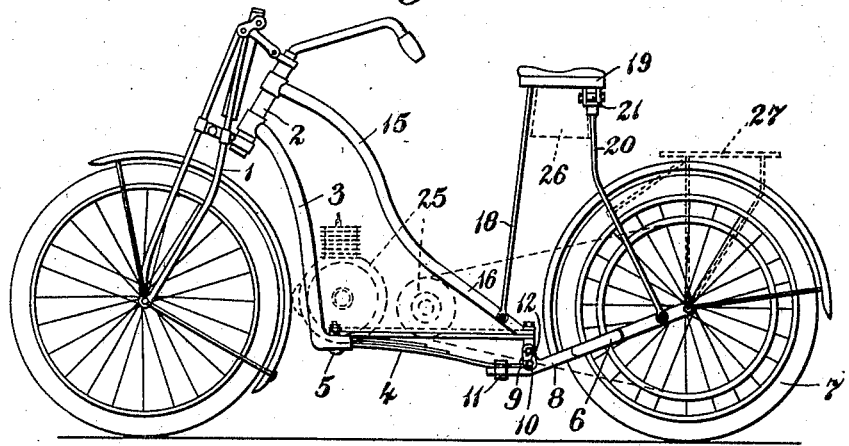
Figure 6 is a side elevation of a motor bicycle embodying my invention.
Figure 7:
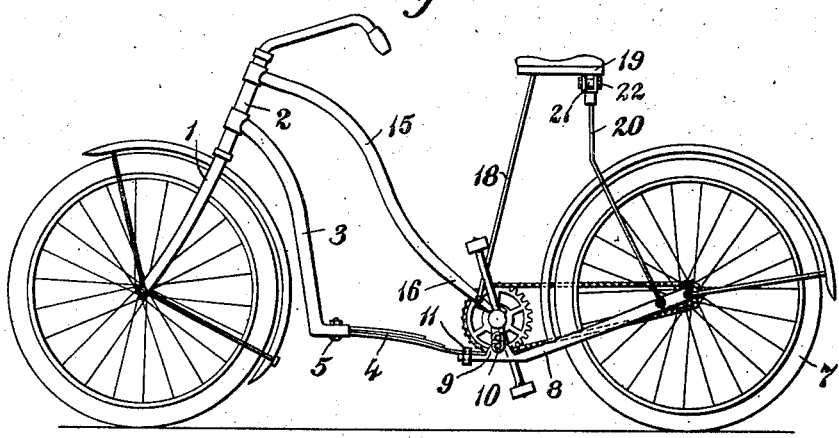
Figure 7 is a side elevation of an ordinary or push bicycle embodying my invention.

To the bolt 10 on either side of the ears 9 is connected links 12, 12, and these are bolted to a U piece 13 carrying a cross bar 14 used in the motor cycle construction shown in Figures 1 and 6.

To the steering pillar 2 is connected a stay or support 15 which projects downwardly and has its end bifurcated, such bifurcations 16, 16 being opened out and connected to the ends of the cross bar 14.

Figure 8:
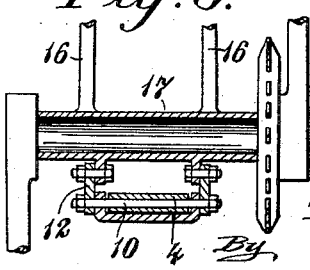
Figure 8 is a section of the joint at the free end of the leaf spring for an ordinary or push bicycle.

In the case of an ordinary or push cycle instead of connecting a cross bar to the U piece 13 I form or connect the pedal axle bracket 17, and the bifurcations 16, 16, are connected to the bracket 17 as at Figure 8.

This bifurcated stay or support forms a means of limiting the movement of the spring 4 and prevents any side and longitudinal movement of same.

To the bifurcations 16, 16 are secured two rods 18, 18 and these are continued upwards and rearwards and carry the front of the seat 19.

Two rods 20 extend downwardly from the back forks 6; these rods project forwardly and carry at their upper ends a half elliptic leaf spring 21, the spring 21 being connected at its ends to the rods 20, 20, while the back of the seat 19 is connected at the centre of the spring 21 by a bolt 22 or otherwise.

In a motor cycle (Figures 1 and 6), as is well known, it is necessary to provide foot boards on each side of the frame, and to carry these foot boards I provide a frame consisting of a cross bar 23, affixed to the bracket 3 by the same bolt 5 that connects the leaf spring 4, and to the ends of the bar 23 I attach the forward ends of bars 24, 24, the other ends being attached to the cross bar 14, and to these bars 23 and 24 are connected the usual foot boards.

In a motor cycle, the engine gear etc., 25, may be carried by the bracket 3, or by the bracket 3 and spring 4, and the petrol tank 26 may be positioned under the seat 19, and a rear seat 27 may be carried by the back wheel axle and the rods 20, as shown in dotted lines in Figure 1.

The stay or support 15 acts as a resistance to the action of the spring 4, and, in consequence, somewhat limits the action of the spring 4, while at the same time ensuring a perfect cushioning during travel over rough roads, and preventing any side or longitudinal movement.

I claim as my invention and desire to secure by Letters Patent:—

1. In cycles, a front frame member including a steering pillar and a bracket depending rearwardly downward to a point below the hub of the front wheel, a rear frame member comprising a support for the back wheel, sloping forwardly and downwardly from the hub of said back wheel and a leaf spring secured at its respective ends to the lower portion of said bracket and forward portion of said rear frame member.

2. In cycles, a front member including a steering pillar and a downwardly extending portion, a rear frame member comprising a support for the back wheel, a leaf spring connected at its respective ends to the lower ends of the frame members, a stay rod rigidly connected to said steering pillar and extending toward the rear frame members, and a link pivotally connected at its ends to said rear frame member and to said stay rod.

3. In cycles, a front frame member including a steering pillar and provided with a rearwardly and downwardly extending bracket having a channel formed in its lower end, a rear frame member comprising a support for the wheel, a leaf spring having one end secured within said channel and its other end to the lower portion of the rear frame member, a stay rod rigidly connected to said steering pillar and extending toward the rear frame member, and a link pivotally connected at its ends to said rear frame member and to said stay rod.

4. In cycles, a front frame member including a steering pillar, a rear frame member comprising a support for the back wheel, a leaf spring connected at its respective ends to the lower portion of said frame members, a stay-rod rigidly connected to said steering pillar, extending toward the rear frame member and provided with a bifurcated lower end, a cross bar supported by said rear frame and connected at its ends to the bifurcated end of said stay rod.

5. In cycles, a front frame member including a steering pillar, a rear frame member including a rod having forked end portions embracing the rear wheel, a bracket depending from said steering pillar, a leaf spring secured at its respective ends to said bracket and said rear frame member, a cross bar connected to said rear frame member, a stay-rod rigidly connected to said steering pillar and having a bifurcated lower end connected to the ends of said cross bar, a seat, a pair of rods connected at one end to said seat and each connected at its other end to one of the bifurcated end portions of said stay rod, a second pair of rods each secured at one end to the forked end portions of the rear frame member and resiliently secured at the other end to said seat.

6. In cycles, a front frame member including a steering pillar, a rear frame member including a rod having forked end portions embracing the rear wheel, a bracket depending from said steering pillar, a leaf spring secured at its respective ends to said bracket and said rear frame member, a cross bar connected to said rear frame member, a stay rod rigidly connected to said steering pillar and having a bifurcated lower end connected to the ends of said cross bar, a seat, a leaf spring for supporting said seat, a pair of rods connected at one end to said seat and each connected at its other end to one of the bifurcated portions of the stay rod, a second pair of rods each secured at one end to the forked end portions of the rear frame member, and secured at their other ends to said leaf spring.

7. In cycles, a front frame member including a steering pillar, a rear frame member including a rod having forked end portions embracing the rear wheel, a bracket depending from said steering pillar, a leaf spring secured at its respective ends to said bracket and to said rear frame member, a pedal bar connected to said rear frame member, a stay-rod rigidly connected to said steering pillar and having a bifurcated lower end connected to said pedal bar, a seat, a pair of rods connected at one end to said seat and each connected at its other end to the bifurcated end of said stay-rod, a second pair of rods each secured at one end to the forked end portions of the rear frame member and resiliently secured at their other ends to said seat.

In testimony whereof I have hereunto set my hand in presence of two subscribing witnesses.

THOMAS DANIEL KELLY.

Witnesses:
RICHARD CORE GARDNER,
JESSIE MORGAN.